2,865,856
METHOD OF INHIBITING CORROSION OF METALS

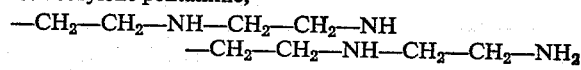

William B. Hughes, Tulsa, Okla., assignor to Cities Service Research and Development Company, New York, N. Y., a corporation of New Jersey No Drawing. Application November 17, 1955
Serial No. 547,535

6 Claims. (Cl. 252—8.55)

This invention relates to new compositions of matter and more particularly with improved compositions and processes for inhibiting corrosion of metals.

It is generally recognized that oil-producing formations often yield with the crude oil brine which is extremely corrosive in its action upon the oil-producing and collecting equipment, including the metal tubing, casings, pumps, pipe lines, and storage equipment. This type of corrosion is particularly noticeable in wells producing brine which contain varying amounts of hydrogen sulfide, carbon dioxide, and other acidic materials therein.

Considerable effort has been directed in the past to reducing the cost of maintaining production and collection equipment free of corrosion by introducing into the well various neutralizer solutions such as caustic soda or other alkaline solutions. Other water-soluble corrosion inhibitors have also been used such as formaldehyde, nitrogen bases of various types, amines, and combinations of the foregoing compounds. Experience has shown that while some of these corrosion inhibitors are satisfactory at certain locations when used in wells which produce little water as compared to the oil produced, their cost becomes prohibitive when used in wells producing large amounts of water, since substantially the same concentration of the inhibitor must be maintained in the water phase in both types of wells in order to prevent corrosion.

It is accordingly an object of this invention to provide improved corrosion inhibiting compounds having structures which make them uniquely effective in minimizing and reducing corrosion in wells producing oil-brine mixtures, and particularly reducing corrosion in wells in which large amounts of brine are produced as compared to oil.

I have discovered that the new compositions of my invention which comprise oxazoline-imidazoline structures according to the method hereafter described possess uniquely effective corrosion inhibiting properties. The new oxazoline-imidazoline compounds of my invention are prepared by reacting an alkyl diamine with a dicarboxylic acid. Water produced during the reaction of the amine and acid is removed by distillation to provide an intermediate imidazoline reaction product. To obtain the new oxazoline-imidazoline structure the intermediate imidazoline reaction product is reacted with alkanolamine and heated to expel water formed in the reaction. An oxazoline-imidazoline reaction product is obtained having the general formula:

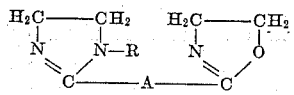

in which R is hydrogen or an amine radical of ethylene diamine, —CH$_2$—CH$_2$—NH$_2$; diethylene triamine,

—CH$_2$—CH$_2$—NH—CH$_2$—CH$_2$—NH$_2$ triethylene tetramine,

—CH$_2$—CH$_2$—NH—CH$_2$—CH$_2$
  —NH—CH$_2$—CH$_2$—NH$_2$ tetraethylene pentamine,

—CH$_2$—CH$_2$—NH—CH$_2$—CH$_2$—NH
  —CH$_2$—CH$_2$—NH—CH$_2$—CH$_2$—NH$_2$

The particular R present in the finished product will depend on the amine used in preparing the intermediate imidazoline compound. The A represents the acid residue of the dicarboxylic acid used in the preparation and will generally be an acid having from 1 to about 14 carbon atoms of saturated or unsaturated structure. I have found the following acids to be generally effective in providing oxazoline-imidazoline structures of unusually effective corrosion inhibiting properties: dimerized linoleic acid, generally referred to as dimer acid, succinic acid, sebacic acid, terephthalic acid, and mucic acid.

In preparing my new compositions, I slowly add to the diamine an equi-molar quantity of the dicarboxylic acid together with a small amount of a benzene solvent. The addition of the benzene provides a benzene-water azeotrope which makes it possible to remove water from the reaction mixture. I have found that in general heating the reaction mixture to a temperature of about 90 to 110° C. for a period of from 2 to 6 hours is sufficient to remove the water produced from the mixture. The amount of water recovered will be an indication of the degree of completion of the reaction, since normally in the reaction of 1 mol of diamine with 1 mol of acid, 2 mols of water will be produced. This is the result of the reaction of 1 acid carboxyl group with 2 amine groups of the diamine, which results in the formation of the imidazoline ring. It is, of course, understood that the temperature at which heating is carried out and the period of time involved will vary, depending on the amount and type of reactants used.

To the intermediate reaction product which is the imidazoline having situated thereon the remainder of the original amine compound 1 mol of 2-amino-ethanol is added. The mixture is then heated to a temperature sufficient to remove the 2 mols of water produced in the reaction of the amine and the carboxyl group present. Upon recovery of substantially the theoretical amount of water the benzene is removed from the reaction product by distillation.

In order to understand more thoroughly the nature of the new compositions of my invention and the manner in which their preparation is carried out, the following examples are provided:

EXAMPLE 1

To 60 grams (1.0 mol) of ethylene diamine, 166 grams (1.0 mol) of terephthalic acid and 50 ml. of benzene were added. The mixture was heated under a water trap condenser to distill the water-benzene azeotropic mixture, with benzene being returned continuously through the decanter still-head to the reaction mixture. At the end of a five hour reaction period, 36 grams of water had been collected. This represents the amount of water that is removable from the reaction of one carboxyl group with two amine groups to form an intermediate reaction product having an imidazoline ring. To the imidazoline-benzene mixture 61 grams (1.0 mol) of 2-aminoethanol was added and heating continued, with water being collected as previously described. When an additional 2 mols of water were obtained from the reaction zone, benzene was removed by distillation. The resulting imidazoline-oxazoline compound was light yellow in color and had a molecular weight of 214. The theoretical molecular weight for the expected compound is 215.

EXAMPLE 2

Following the procedure set forth in Example 1, 118 grams (1.0 mol) of sebacic acid was added to 60 grams (1.0 mol) of ethylene diamine. To the intermediate reaction product obtained after removal of water, 61 grams (1 mol) of 2-aminoethanol was added. Heating was conducted to remove water and provide the desired oxazoline-imidazoline reaction product.

EXAMPLE 3

Following the procedure outlined in Example 1, 600 grams (1.0 mol) of dimerized linoleic acid (dimer acid) was reacted with 60 grams (1 mol) of ethylene diamine in the presence of 50 ml. of benzene. The dimerized linoleic acid was prepared according to the directions provided in the "Journal of American Oil Chemists Society," 24, 26 (March 1947). To the intermediate reaction product obtained after removal of water, 61 grams (1 mol) of 2-aminoethanol was added and heating conducted until approximately 36 grams of water was obtained. The reaction product was then dried and tested as a corrosion inhibitor and provided the results indicated by inhibitor 7 in Table I which follows.

EXAMPLE 4

Following the procedure set forth in Example 1 above, 103 grams (1.0 mol) of diethylene triamine was reacted with 166 grams (1.0 mol) of terephthalic acid in the presence of 50 ml. of benzene. The mixture was heated under a water trap condenser to distill the water-benzene azeotropic mixture, with benzene being returned continuously through the decanter still-head to the reaction mixture. At the end of a five hour reaction period, 36 grams of water had been collected, representing that amount of water which would be theoretically obtainable from the reaction of one carboxyl group with two amino groups in the formation of an imidazoline ring. To the imidazoline-benzene mixture, 61 grams (1.0 mol) of 2-aminoethanol were added and heating continued, with water being collected as described above. When an additional 2 mols (36 grams) of water was removed from the reaction mixture, benzene was removed by distillation. The resulting oxazoline-imidazoline compound had a molecular weight of 278. The theoretical molecular weight for this compound is 282. This reaction product (Inhibitor No. 4) tested as a corrosion inhibitor, provided the protection recorded in Table I which follows.

EXAMPLE 5

Using the procedure outlined in Example 4 above, 118 grams (1.0 mol) of sebacic acid was added to 103 grams (1.0 mol) of diethylene triamine in the presence of 50 ml. of benzene. The mixture was distilled to remove water and to provide an intermediate reaction product, which was reacted with 61 grams of 2-amino-ethanol to provide the desired oxazoline-imidazoline compound. This product was tested as a corrosion inhibitor, and is identified as inhibitor number 2 in Table I which follows.

EXAMPLE 6

Following the procedure set forth in Example 4 above, 103 grams (1.0 mol) of diethylene triamine was reacted with 600 grams (1.0 mol) of dimer acid in the presence of 50 ml. benzene. After removal of water the intermediate reaction product was further reacted with 61 grams (1.0 mol) of 2-amino-ethanol and heated until 2 mols of water were recovered.

EXAMPLE 7

To 189 grams (1.0 mol) of tetraethylene pentamine 166 grams (1.0 mol) of terephthalic acid and 50 ml. of benzene were added. The mixture was heated under a water trap condenser to distill the water-benzene azeotropic mixture with benzene being returned continuously through the decanter stillhead to the reaction mixture. At the end of a 5-hour reaction period 36 grams of water had been collected representing the amount of water that would have been removed by the reaction of one carboxyl group with two amine groups to form an imidazoline ring. To the imidazoline benzene mixture 61 grams (1.0 mol) of 2-amino-ethanol was added and heating continued with water being collected as previously described. When an additional 2 mols (36 grams) of water had been removed from the reaction zone, benzene was removed by distillation. The resulting imidazoline-oxazoline material had a molecular weight of 330. The theoretical molecular weight for this expected compound is 334.

EXAMPLE 8

Following the procedure outlined in Example 7 above, 202 grams (1.0 mol) of sebacic acid was added to 189 grams (1.0 mol) of tetra-ethylene pentamine in the presence of 50 ml. of benzene. After removal of water the intermediate reaction product was found reacted with 1 mol (61 grams) of 2-amino-ethanol and distilled with benzene until 2 mols (36 grams) of water was removed.

EXAMPLE 9

Following the procedure outlined in Example 7, 600 grams (1.0 mol) of dimer acid was reacted with 189 grams (1.0 mol) of tetra-ethylene pentamine in the presence of 50 ml. of benzene. After removal of 2 mols of water indicating reaction of the amine groups with the acid carboxyl to form an intermediate product having an imidazoline ring, 61 grams of 2-amino-ethanol was added and heating further continued until an additional 36 grams of water was obtained. The reaction product was then dried and tested according to the method hereinafter described.

EXAMPLE 10

To 146 grams (1.0 mol) of triethylene tetramine 166 grams (1.0 mol) of terephthalic acid and 50 ml. of benzene were added. The mixture was heated under a water trap condenser to distill the water-benzene azeotropic mixture with benzene being returned continuously through the decanter stillhead to the reaction mixture. At the end of a 5-hour reaction period, 36 grams of water had been collected representing the amount of water that would have been removed by the reaction of one carboxyl group with two amine groups to form an imidazoline ring. To the imidazoline-benzene mixture 61 grams (1 mol) of 2-amino-ethanol was added with heating continued and water being collected as previously described. When an additional two mols (36 grams) of water had been removed from the reaction mixture, the benzene was removed by distillation. The resulting imidazoline-oxazoline material was found to have a molecular weight of 296. The theoretical molecular weight for this expected compound is 301.

EXAMPLE 11

Following the procedure set forth in Example 10 above, 210 grams (1.0 mol) of mucic acid was added to 146 grams of triethylene tetramine in the presence of 50 ml. of benzene. After removal of 2 mols of water the imidazoline benzene intermediate reaction product was further reacted with 61 grams (1.0 mol) of 2-amino-ethanol and heating continued until an additional 2 mols of water was recovered. The reaction product was washed and tested according to the method hereafter described.

EXAMPLE 12

To 600 grams (1.0 mol) of dimer acid, 146 grams (1.0 mol) of triethylene tetramine was added in the presence of 50 ml. of benzene. The reaction mixture was heated until 36 grams of water was recovered, after which 61 grams of 2-amino-ethanol was added with further heating until an additional 36 grams of water had been recovered. After removal of benzene, a reaction product having a molecular weight of 730 as compared to the theoretical expected weight of 735 was obtained.

The effectiveness of my new compositions in reducing the corrosiveness of oil field brine may be more fully understood by reference to certain tests which I have conducted, using prepared brines to substantially duplicate well conditions. The test procedure involved a measurement of the corrosive action of the hypothetical well fluid as inhibited with compositions described above upon weighed, cleaned, and polished strips of number 18 gauge cold-rolled steel measuring one-quarter inch by four inches, under conditions closely approximating those existing in a producing well and a comparison thereof with the results obtained by subjecting identical strips to the corrosive action of my hypothetical well fluid without inhibitor added.

The test includes the use of a number of bottles or flasks sufficient to provide one for the testing of corrosion inhibitors in varying amounts, and one for comparison (a blank) for each of the corrosion inhibitors being tested. To cleaned and numbered one liter Erlenmeyer flasks, 600 ml. of a 5 weight percent aqueous sodium chloride solution and 400 ml. of depolarized kerosene were added. A stopper provided with gas inlet and outlet ports was inserted in the flask, and natural gas or nitrogen was blown through the brine solution for about one hour to purge any oxygen present. After the purging was completed, the corrosive inhibitor being tested was added to each flask in amounts ranging from 10 to 50 p. p. m., based on the quantity of brine present in the flask. The weighed and cleaned test strips were then attached to the end of a glass rod in such a manner that two pieces of plastic laboratory tubing prevented contact between the strip and the glass, while a third piece of tubing held the strip firmly in position. The glass rod was then inserted through the rubber stopper in such a manner that one-half of the test strip was in contact with the kerosene, and the other half in contact with the aqueous layer. At all times precautions were maintained to exclude air from the bottles by frequent and liberal purging with the natural gas or nitrogen.

After addition of the inhibitor was completed, hydrogen sulfide gas was bubbled through the liquid until the liquid was saturated with the gas. The flask was then sealed and allowed to stand for 48 hours. The steel strip was then removed, washed in kerosene and then methanol, and finally washed with water prior to acid cleaning. The acid cleaning consisted of treating the test strip in a one weight percent hydrochloric acid solution for a few seconds, washing with water, and thoroughly wiping with cheesecloth. The acid treatment was repeated several times until the original luster of the test strip was obtained as nearly as possible with a minimum amount of acid treating. After acid treating was completed, the strips were again washed in methanol, followed by acetone, and were then reweighed to determine the weight loss. Blank runs were used for each inhibitor to provide the comparison basis.

The changes in weight of the test strips during the corrosion test were taken as a measure of the effectiveness of the inhibitor compositions; thus, a protection percent may be calculated for each of the test strips taken from the inhibited test fluids in accordance with the following formula:

$$\frac{L1 - L2}{L1} \times 100$$

in which L1 is the loss in weight of strips taken from uninhibited test fluids, and L2 is the loss in weight of strips which were subjected to inhibited test fluids.

The results of tests carried out with oxazoline-imidazoline structures of my invention are summarized in the table below. For each of the acids recorded, it is understood that the oxazoline-imidazoline was prepared by reaction of the acid with the monoethanolamine. Under "Percent protection," three columns are provided for respective test results obtained when utilizing 25, 10, and 5 p. p. m. respectively of the specific oxazoline-imidazoline compounds.

Table I

| Inhibitor No. | Diamine Used [1] | Acid Used | Molar Ratio Diamine: Acid:MEA [2] | Percent Protection | | |
|---|---|---|---|---|---|---|
| | | | | 25 p. p. m. | 10 p. p. m. | 5 p. p. m. |
| 1 | DETA | Dimer | 1:1:1 | 96.7 | 95.3 | 81.9 |
| 2 | DETA | Succinic | 1:1:1 | 98.5 | 90.0 | 62.1 |
| 3 | DETA | Sebacic | 1:1:1 | 98.6 | 88.3 | 44.1 |
| 4 | DETA | terephthalic | 1:1:1 | 98.6 | 95.7 | 90.1 |
| 5 | DETA | Mucic | 1:1:1 | 89.9 | 54.2 | -------- |
| 6 | DETA | Oxalic | 1:1:1 | 36.1 | 4.0 | -------- |
| 7 | EDA | Dimer | 1:1:1 | 89.3 | 73.6 | -------- |
| 8 | EDA | Succinic | 1:1:1 | 90.1 | 81.8 | 70.1 |
| 9 | EDA | Sebacic | 1:1:1 | 85.4 | 80.8 | 60.0 |
| 10 | EDA | terephthalic | 1:1:1 | 90.7 | 78.4 | -------- |
| 11 | EDA | Mucic | 1:1:1 | 72.1 | 54.8 | -------- |
| 12 | TETA | Dimer | 1:1:1 | 98.4 | 98.8 | 93.8 |
| 13 | TETA | Succinic | 1:1:1 | 99.6 | 97.8 | 91.6 |
| 14 | TETA | Sebacic | 1:1:1 | 98.7 | 93.2 | 90.4 |
| 15 | TETA | terephthalic | 1:1:1 | 96.8 | 92.0 | 89.0 |
| 16 | TETA | Mucic | 1:1:1 | 94.1 | 90.4 | 78.6 |
| 17 | TEPA | Dimer | 1:1:1 | 99.1 | 96.6 | 91.6 |
| 18 | TEPA | Succinic | 1:1:1 | 98.6 | 93.7 | 90.0 |
| 19 | TEPA | Sebacic | 1:1:1 | 98.4 | 92.0 | 88.7 |
| 20 | TEPA | terephthalic | 1:1:1 | 97.9 | 91.8 | 84.3 |
| 21 | TEPA | Mucic | 1:1:1 | 96.2 | 91.0 | 86.4 |
| 22 | DETA | Dimer | 2:1:0 | 76.1 | -------- | -------- |
| 23 | -------- | do | 0:1:2 | 89.2 | -------- | -------- |

[1] DETA is diethylene triamine; EDA is ethylene diamine; TETA is triethylene tetramine; TEPA is tetraethylene pentamine.
[2] MEA is monoethanolamine.

It will be evident from the foregoing table that corrosion may be effectively reduced to a value of one-tenth or less of that due to the natural flow of well fluids through the well tubing, pipe lines by incorporating in the well fluid comparatively small quantities of the oxazoline-imidazoline compounds.

In using my improved compositions for protecting the piping, casing, and other equipment which comes in contact with the corrosive fluids, I have found that excellent results may be obtained by injecting an appropriate quantity, generally not more than 100 p. p. m., of a selected corrosion inhibiting compound into a producing well so that it may mingle with the oil brine mixture and come into contact with the producing equipment. If desired, the inhibiting composition may be introduced directly into the top of the casing and be permitted to flow down into the well, and thence back through the tubing and into related apparatus. I have found that if this procedure is followed, substantial reduction in corrosion throughout the entire production and collecting system may be obtained.

The nature of the inhibiting action of my improved composition is not fully understood, but apparently the oxazoline-imidazoline compounds of this invention preferentially wet the surface of the metal equipment with oil, thus excluding the brine from contact with the metal. In any event, however, no matter what the mechanics of the corrosion inhibiting may be, they are extremely and surprisingly effective in protecting oil well and oil field equipment from corrosion, even when used in amounts of 50 p. p. m. or less, based on the oil content of the well fluid.

It is to be understood that the improved compositions of my invention are not limited to use alone and may be applied along with other agents commonly introduced in the producing oil wells for breaking emulsions, preventing scaled formation, minimizing pitting, etc. It is further evident that my invention is not restricted to the use of improved compositions for inhibiting corrosion in oil wells, but may be employed to perform this function in the presence of corrosive fluids derived from other sources.

Having now described my invention, what I claim as new and useful is:

1. The process of preventing the corrosion of ferrous metals exposed to contact with corrosive fluids containing varying amounts of hydrogen sulfide, carbon dioxide and other acidic materials which comprises introducing into such fluids a small quantity, sufficient to substantially inhibit corrosion, of an inhibitor having the general formula

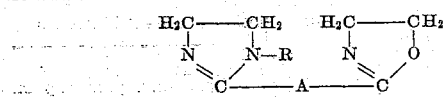

wherein R is selected from the group consisting of H, $$-CH_2-CH_2-NH_2$$

$$-CH_2-CH_2-NH-CH_2-CH_2-NH_2$$

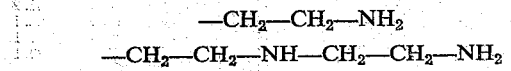

and

and A is a divalent hydrocarbon radical having from 2 to 14 carbon atoms, and thereafter causing the inhibitor to come into contact with the metal to be protected.

2. The process according to claim 1 in which R is $-CH_2-CH_2-NH_2$ and A is $-(CH_2)_7-$.

3. The process according to claim 1 in which R is $-CH_2-CH_2-NH_2$ and A is $-(CH_2)_6-$.

4. The process according to claim 1 in which R is $-CH_2-CH_2-NH_2$ and A is $-C_6H_4-$.

5. The process according to claim 1 in which R is $-CH_2-CH_2-NH_2$ and A is $-(CH_2)_8-$.

6. The process according to claim 1 in which R is $-CH_2-CH_2-NH_2$ and A is $-(CH_2)_4-$.

References Cited in the file of this patent

UNITED STATES PATENTS

| | | |
|---|---|---|
| 2,114,326 | Adams et al. | Apr. 19, 1938 |
| 2,569,428 | Rowland | Sept. 25, 1951 |
| 2,636,038 | Brandner | Apr. 21, 1953 |
| 2,646,399 | Hughes | July 21, 1953 |
| 2,691,631 | Metler | Oct. 12, 1954 |
| 2,721,175 | Lytle | Oct. 18, 1955 |
| 2,759,894 | Matuszak | Aug. 21, 1956 |
| 2,773,879 | Sterlin | Dec. 11, 1956 |
| 2,793,997 | Hughes | May 28, 1957 |